(12) United States Patent
Becherer et al.

(10) Patent No.: US 8,120,929 B2
(45) Date of Patent: Feb. 21, 2012

(54) ELECTRICAL OR ELECTRONIC LEVEL INDICATOR

(75) Inventors: Frank Becherer, Haslach (DE); Winfried Rauer, Fischerbach (DE); Ralf Koernle, Zell a.H. (DE)

(73) Assignee: Vega Grieshaber KG, Wolfach (DE)

( * ) Notice: Subject to any disclaimer, the term of this patent is extended or adjusted under 35 U.S.C. 154(b) by 282 days.

(21) Appl. No.: 12/453,585

(22) Filed: May 15, 2009

(65) Prior Publication Data
US 2009/0284938 A1    Nov. 19, 2009

Related U.S. Application Data

(60) Provisional application No. 61/071,832, filed on May 20, 2008.

(30) Foreign Application Priority Data

May 19, 2008    (EP) ..................................... 08009188

(51) Int. Cl.
*H05K 7/02* (2006.01)
*H05K 7/04* (2006.01)

(52) U.S. Cl. .......................... 361/807; 361/810; 361/803
(58) Field of Classification Search .................. 361/803, 361/807, 810, 760, 728–730, 720, 748
See application file for complete search history.

(56) References Cited

U.S. PATENT DOCUMENTS

| | | | |
|---|---|---|---|
| 3,573,558 A * | 4/1971 | Babcock | 361/679.08 |
| 6,254,008 B1 * | 7/2001 | Erickson et al. | 236/44 A |
| 6,293,828 B1 | 9/2001 | Colver et al. | |
| 6,570,770 B1 | 5/2003 | Ross et al. | |
| 7,350,954 B2 * | 4/2008 | Snider et al. | 362/612 |
| 7,855,873 B2 * | 12/2010 | Darr et al. | 361/642 |

* cited by examiner

*Primary Examiner* — Hung S Bui
(74) *Attorney, Agent, or Firm* — The Nath Law Group; Jerald L. Meyer; Stanley N. Protigal

(57) ABSTRACT

An electrical or electronic level indicator is positioned in a plug-in housing 24. The plug-in housing 24 is closed with a cover 10. This cover 10 is furnished with a handle bar 11, which serves as an aid for removing the cover 10. Positioned inside the cover 10 are rotating cylindrical pins 12, 13 which allow the potentiometers 32 and/or switches 33 to be adjusted. The electrical components 32, 33 are positioned on a circuit board 30, which lies inside the cover 10.

12 Claims, 3 Drawing Sheets

ELECTRICAL OR ELECTRONIC LEVEL INDICATOR

Figure 1:
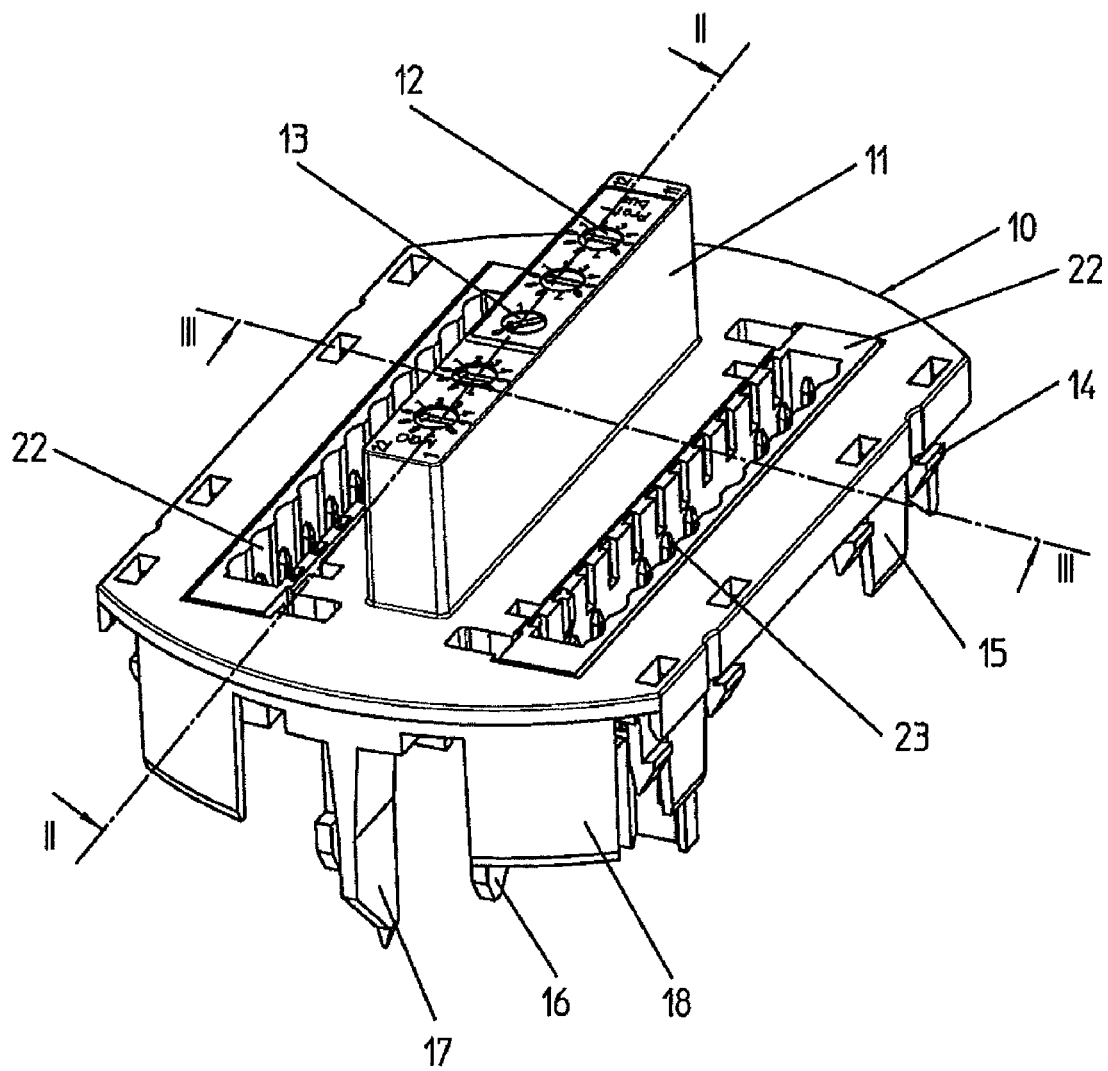

This is a Non-Provisional Application claiming the benefit under 35 USC 119(e) of U.S. Provisional Patent Application No. 61/071,832, filed on May 20, 2008, and this non-provisional application claims priority from the European Patent Application No. 08 009188.7, filed on May 19, 2008, the entire content of which is hereby incorporated by reference in its entirety.

The invention relates to an electrical or electronic level indicator which is positioned within a plug-in housing.

Measuring devices of this kind must often be removed from their housing in order to order to permit subsequent adjustment of the electronic systems or simply to replace certain modules for the purpose of repair.

The present invention is based on the problem of designing the device in such a way that both the removal of the device is facilitated and the adjustment process is simplified.

To solve this problem, a handle bar projecting outwardly from the cover of an electronic holding fixture is provided in such a way that the handle bar serves as an aid for removal, but also contains externally accessible control elements for the mechanical adjustment of electronic components located beneath the cover.

In accordance with one configuration, these components can be, e.g., potentiometers, and thus variable resistors, or rotary switches.

In one configuration, control elements are cylindrical pins that are positioned with an axially parallel disposition and a rotating mount in recesses in the handle bar; these cylindrical pins have a groove on their outer ends, in accordance with the screw type, so that the cylindrical pins can be adjusted using a screwdriver or other tool.

In one configuration, the indicated electrical components are furnished on a circuit board, which is positioned inside the cover of a holding fixture.

According to one configuration, a particularly simple mounting process is proposed, according to which the electrical components are positioned on the side of the circuit board facing the handle bar and have insertion grooves in which the control elements engage in a force-fitting and form-fitting manner using coupling elements that correspond to the insertion grooves.

According to one configuration, when the handle bar is elongated in the shape the control elements are arranged in a row. In this case, the cover can have at least one window which runs parallel to this row; positioned inside the window are outwardly accessible connecting contacts for the measuring device.

According to one configuration, to simplify the mounting process or the process of subsequent repair, it is proposed to secure the circuit boards, along with their electrical components, on the back of the cover in a detachable manner, preferably with screws.

The subject matter of the invention is next described in detail on the basis of a preferred embodiment, which is depicted in the drawings.

Figure 2:
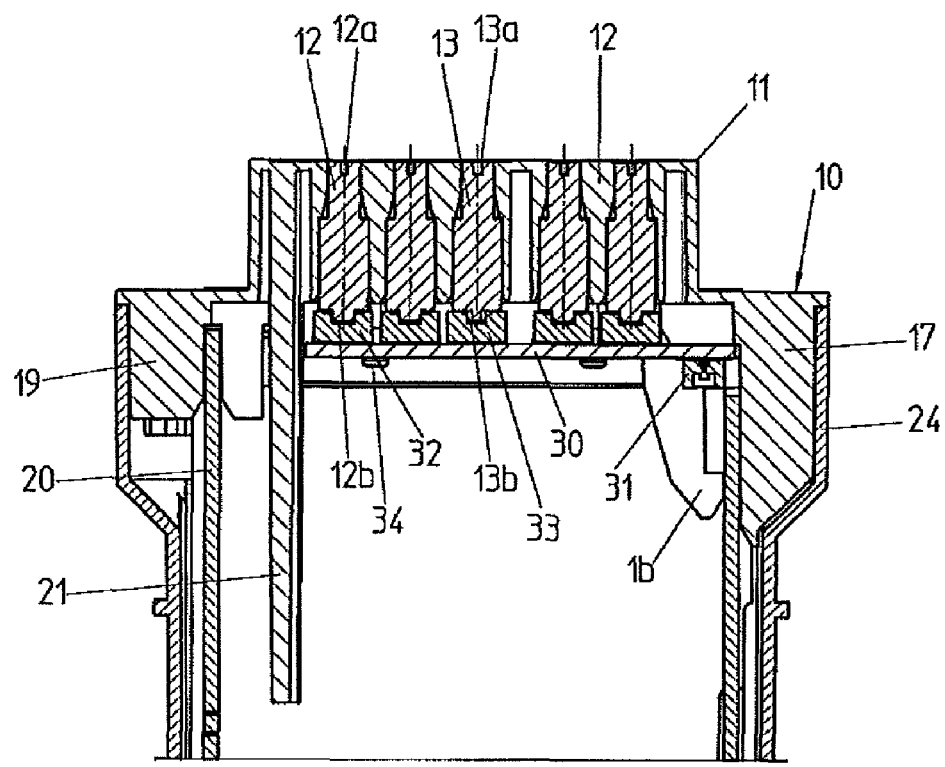
Figure 3:
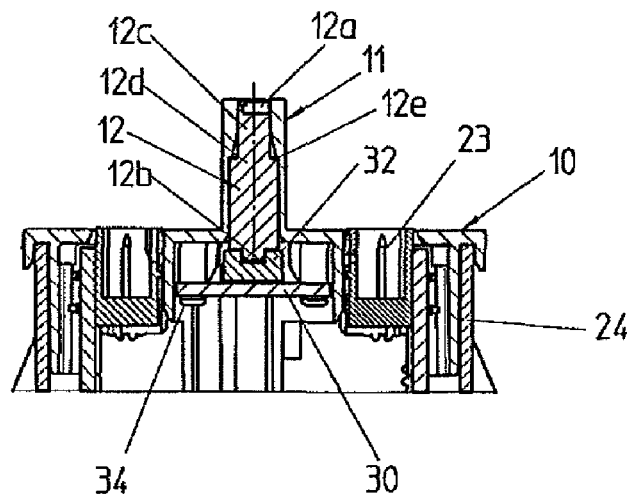
Figure 4:
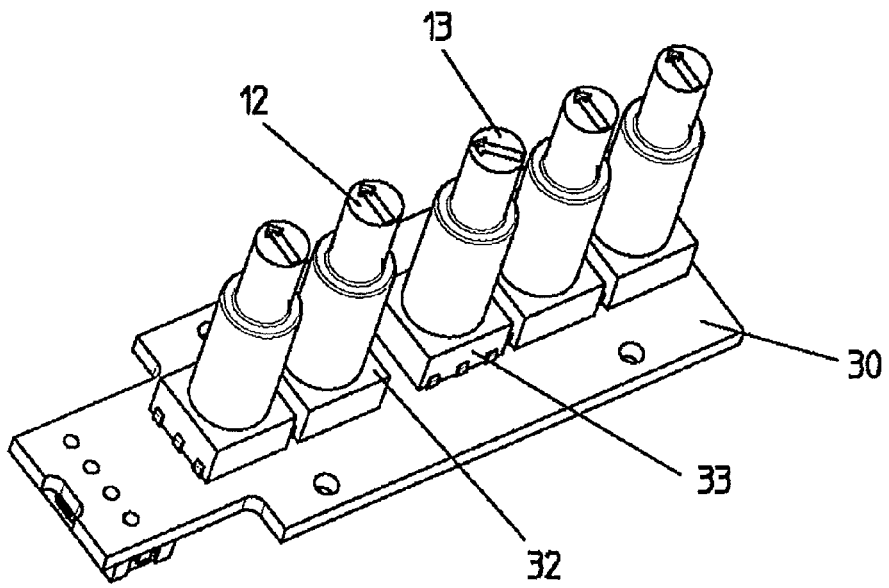
Figure 5:
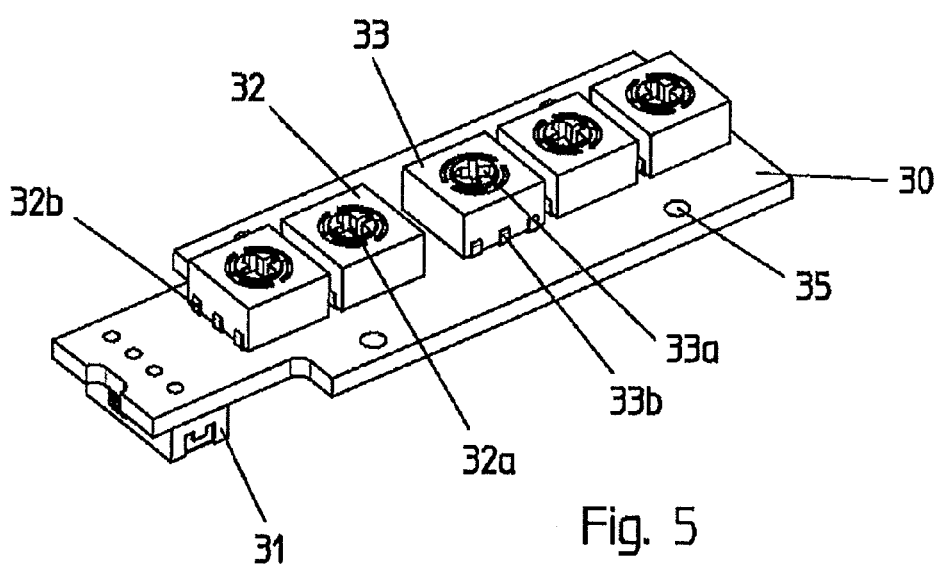

Shown are:

FIG. 1 a perspective view of the cover
FIG. 2 a section along line II-II of FIG. 1
FIG. 3 a section along line III-III of FIG. 1
FIG. 4 a perspective view of the circuit board, with installed control elements
FIG. 5 the circuit board of FIG. 4, without the control elements FIG. 1 shows only the cover 10, as designed according to the invention. The cover 10 can be inserted from above into a housing indicated by reference numeral 24 in FIG. 2. The housing is, e.g., a holding fixture of plastic designed to receive the control unit of a level indicator. Through use of a suitable guiding means, this holding fixture itself can be positioned in a surrounding housing ideally made of metal or plastic.

The cover 10 has a centrally positioned handle bar 11, on which rotating control elements 12 and 13 are positioned, to form a row. The cover 10 has windows 22 that run parallel to the handle bar 11. Inside of the cover 10 are connecting contacts for the electronic equipment (which is not depicted), such that plugs (which also are not depicted) can be inserted into the windows.

Provided on the lateral rims of the cover 10 are various hooks or tabs 14, as well as guide bars 15, 16, 17, 18, which serve to guide and securely position the cover 10 inside the housing 24.

The arrangement and design of the control elements 12, 13, and of the electrical components actuated by them, can be seen from the cross-sections provided in FIGS. 2 and 3.

The electrical components, specifically the potentiometer 32 and rotary switch 33, are positioned on a circuit board 30 fastened with screws inside the cover 10 and below the handle bar 11. On their side facing the control elements 12, 13, these components have cross grooves 32a and 33a, as can be seen in FIG. 5. The control elements 12, 13 engage with these cross grooves 32a, 33a in a form-fitting and force-fitting manner, using their coupling bars 12b, 13b, which have a matching design. As a result, the potentiometer 32 or rotary switch 33 can be adjusted or, as the case may be, actuated by rotating the control elements 12, 13.

On their upper exterior side, as shown in the drawing, the control elements 12, 13 and their screw heads are provided with grooves 12a, 13a, so that they can be adjusted into position with a screwdriver.

As can be best seen in FIG. 3, the control elements 12, 13, have an upper pin part 12c that is slender and a lower pin part 12d of greater cross-section, thereby producing a circular ledge 12e that serves as a stop. As a result, these control elements can be mounted in inseparable and rotating fashion in recesses that taper in the upward direction within the handle bar 11.

By unscrewing the screws 34, the circuit boards 30, with the electrical components 32, 33, can be removed, so that the control elements 12, 13 can also be removed and replaced, if so required.

The electrical connection of components 32 and 33 is provided by a connecting terminal 31 furnished on the back of the circuit board 30.

The enlarged perspective views given by FIG. 4 and 5 allow the design and structure of the circuit board 30 to be identified more clearly.

The control elements 12, 13, which are mounted in rotating fashion inside the handle bar 11, are shown in FIG. 4, though not in FIG. 5.

Designed as SMD (surface mounted devices), the potentiometer 32 and rotary switch 33 are positioned on the circuit board 30 and are mechanically and electrically connected to the printed circuit of the circuit board 30 by contacts 32b, 33b, which are provided on the side.

| List of reference numerals | |
|---|---|
| 10 | cover |
| 11 | handle bar |
| 12 | control element for potentiometer |
| 12a | groove |
| 12b | coupling bar |
| 12c | upper portion of pin |
| 12d | lower portion of pin |
| 12e | stop |
| 13 | control element for rotary switch |
| 13a | groove |
| 14 | snap tab |
| 15 | guide bar |
| 16 | guide bar |
| 17 | guide bar |
| 18 | guide bar |
| 19 | guide bar |
| 20 | guide bar |
| 21 | guide bar |
| 22 | window |
| 23 | contact pins |
| 24 | housing |
| 30 | circuit board |
| 31 | connecting terminal |
| 32 | potentiometer |
| 32a | insertion groove |
| 32b | contacts |
| 33 | rotary switch |
| 33a | insertion groove |
| 33b | contacts |
| 34 | screw |
| 35 | screw holes |

The invention claimed is:

1. Electrical or electronic level indicator that is positioned in a plug-in housing with a cover,
wherein
a handle bar projecting outwardly from the cover (10) of an electronic holding fixture is provided, such that the handle bar (11) serves as an aid for removing the cover (10), but also contains externally accessible control elements (12, 13) for the mechanical adjustment of electronic components (32, 33) located beneath the cover (10),
and wherein
the control elements are cylindrical pins (12, 13), which are positioned with an axially parallel disposition and a rotating mount in recesses in the handle bar (11) and which have a groove on their outer ends, in accordance with the screw type, to allow their adjustment with a screwdriver.

2. The electrical or electronic level indicator according to claim 1,
wherein
the electrical components are potentiometers (12) and/or rotary switches (13).

3. The electrical or electronic level indicator according to claim 1,
wherein
the electrical components are provided on a circuit board (30), which is positioned inside the cover (10).

4. The electrical or electronic level indicator according to claim 3,
wherein
the electrical components (12, 13) are positioned on the side of the circuit board (30) facing the handle bar (11) and have insertion grooves in which the control elements (12, 13) engage in a force-fitting and form-fitting manner, using coupling elements (12b, 13b) that correspond to said insertion grooves (32a, 33a).

5. The electrical or electronic level indicator according to claim 4,
wherein
the circuit board, along with the electrical components (12b, 13b), is secured to the back of the cover (10) in a detachable manner.

6. The electrical or electronic level indicator according to claim 4,
wherein
the circuit board, along with the electrical components (12b, 13b), is secured to the back of the cover (10) in a detachable manner with screws.

7. The electrical or electronic level indicator according to claim 1,
wherein
the control elements (12, 13) are arranged in a row and the cover (10) has at least one window (22), which runs parallel to this row and in which are positioned outwardly accessible connecting contacts (23) for the measuring device.

8. Electrical or electronic level indicator that is positioned in a plug-in housing with a cover,
wherein
a handle bar projecting outwardly from the cover (10) of an electronic holding fixture is provided, such that the handle bar (11) serves as an aid for removing the cover (10), but also contains externally accessible control elements (12, 13) for the mechanical adjustment of electronic components (32, 33) located beneath the cover (10),
wherein
the electrical components are provided on a circuit board (30), which is positioned inside the cover (10),
and wherein
the electrical components (12, 13) are positioned on the side of the circuit board (30) facing the handle bar (11) and have insertion grooves in which the control elements (12, 13) engage in a force-fitting and form-fitting manner, using coupling elements (12b, 13b) that correspond to said insertion grooves (32a, 33a).

9. The electrical or electronic level indicator according to claim 8,
wherein
the electrical components are potentiometers (12) and/or rotary switches (13).

10. The electrical or electronic level indicator according to claim 8,
wherein
the control elements (12, 13) are arranged in a row and the cover (10) has at least one window (22), which runs parallel to this row and in which are positioned outwardly accessible connecting contacts (23) for the measuring device.

11. The electrical or electronic level indicator according to claim 8,
wherein
the circuit board, along with the electrical components (12b, 13b), is secured to the back of the cover (10) in a detachable manner, preferably with screws.

12. The electrical or electronic level indicator according to claim 8,
wherein
the circuit board, along with the electrical components (12b, 13b), is secured to the back of the cover (10) in a detachable manner with screws.

* * * * *